United States Patent [19]

Lewis

[11] Patent Number: 5,196,161
[45] Date of Patent: Mar. 23, 1993

[54] FAIL-SAFE STORAGE RACK FOR IRRADIATED FUEL ROD ASSEMBLIES

[75] Inventor: Donald R. Lewis, Pocatello, Id.

[73] Assignee: The United States of America as repsented by the United States Department of Energy, Washington, D.C.

[21] Appl. No.: 744,746

[22] Filed: Aug. 14, 1991

[51] Int. Cl.⁵ .................................................. G21C 19/32
[52] U.S. Cl. .................................................. 376/272
[58] Field of Search .............. 376/272; 976/DIG. 272

[56] References Cited

U.S. PATENT DOCUMENTS

| | | | |
|---|---|---|---|
| 4,187,433 | 2/1980 | Zezza | 376/272 |
| 4,288,698 | 9/1981 | Baatz et al. | 376/272 |
| 4,318,492 | 3/1982 | Peehs et al. | 220/228 |
| 4,348,352 | 9/1982 | Knecht | 376/272 |
| 4,400,344 | 8/1983 | Wachter et al. | 376/272 |
| 4,710,342 | 12/1987 | Helary et al. | 376/272 |
| 4,788,029 | 11/1988 | Kerjean | 376/272 |

Primary Examiner—Donald P. Walsh
Assistant Examiner—Frederick H. Voss
Attorney, Agent, or Firm—William R. Moser; Judson R. Hightower; Richard E. Constant

[57] ABSTRACT

A fail-safe storage rack is provided for interim storage of spent but radioactive nuclear fuel rod assemblies. The rack consists of a checkerboard array of substantially square, elongate receiving tubes fully enclosed by a double walled container, the outer wall of which is imperforate for liquid containment and the inner wall of which is provided with perforations for admitting moderator liquid flow to the elongate receiving tubes, the liquid serving to take up waste heat from the stored nuclear assemblies and dissipate same to the ambient liquid reservoir. A perforated cover sealing the rack facilitates cooling liquid entry and dissipation.

10 Claims, 2 Drawing Sheets

FAIL-SAFE STORAGE RACK FOR IRRADIATED FUEL ROD ASSEMBLIES

GOVERNMENT CONTRACT RIGHTS

The invention described herein was made or conceived in the course of or under Contract No. DE-AC11-76PN00014 between the U.S. Department of Energy and Westinghouse Electric Corporation. The United States Government accordingly has certain rights in this invention, and title thereto is in the U.S. Department of Energy.

TECHNICAL FIELD OF THE INVENTION

The present invention relates to a storage rack for the interim storage of hazardous nuclear fuel assemblies. More particularly, this invention relates to a fail-safe rack structure adapted for surviving catastrophic event storage of recoverable (reusable) irradiated fuel rod assemblies.

BACKGROUND OF THE INVENTION

Nuclear reactors consist of an array of fuel rods containing the radioactive nuclear fuel. The rods are commonly elongated slim metal tubes and are configured in groups, as in modular or unit fuel rod assemblies. After an extended period of reactor use, such irradiated or spent fuel assemblies must be lifted from the reactor proper and replaced while still retaining appreciable amounts of numerous fission products.

Such irradiated fuel assemblies have generally been stored in special liquid filled pools until they are to be reprocessed. Racks for such interim storage of bundles removed from nuclear reactors are known where the assembly receiving tubes stand on a bottom plate of the main storage pool or tank. They are usually braced laterally by structures connected to both the bottom plate and the tank walls, in anticipation of surviving seismic rare disturbances.

Recoverable Irradiated Fuel (RIF) assemblies are placed in storage and utilize pool water to fulfill four basic needs: (1) to provide nuclear isolation between RIF units; (2) to provide radioactive shielding to protect personnel; (3) to remove the heat buildup caused from radioactive decay of the fuel rods; and (4) to limit radioactive contamination to the storage pool and racks. The dependability of a liquid moderator, usually water, to meet these critical needs is contingent on the integrity of the storage pool. If the main reservoir level cannot maintain its functional safe level, e.g., because of a seismic event or piping system failure, then the RIF loaded rack will lose its liquid cover. Such a loss could lead to a critical configuration of the RIF units, leading to excessive heat buildup, possibly lethal radiation levels, and the consequent unregulated broadcast of radioactive contamination in the storage pool.

Because of these ominous risks of moderator loss, commercial facilities must then resort to emergency remedial actions to restore the required liquid cover over the irradiated fuel assemblies. Such steps include but are not necessarily limited to: (1) closing gates to isolate the affected storage; (2) moving single RIF units to an alternate storage pool; (3) moving a loaded storage rack to a functioning pool should the inherent rack design so permit; and (4) rapid refilling the entire reservoir to regain the liquid level essential to proper operation.

If such crash steps cannot be implemented prior to fuel rack exposure, site evacuation may be necessary due to rising radiation levels or the danger of reaching a critical fuel configuration. The dire consequences of even remote events like failure of the pool liquid level over nuclear fuel assemblies is a continuing concern in the nuclear industry, which has accordingly generated many corrective or protective approaches.

Among the prior art approaches to remedial design of nuclear fuel storage assemblies is the storage rack of U.S. Pat. No. 4,400,344 to Wachter, et al., disclosing a rack consisting of a checkerboard array of square storage cells or tubes. Alternate cells in each row include a neutron-absorbing poison material (usually in the tube wall), while the other cells are used for storage of the spent fuel assemblies. For temporary storage, the poison cells contain a moderator like water, and the entire rack is encased in concrete for shielding. The resultant 50 percent loss of rod storage space and the complex construction make evident the expense and the probable inability to withstand a major seismic mishap because of the vulnerability of the concrete casing to fracture.

Another approach to interim storage of rod assemblies is seen in U.S. Pat. No. 4,348,352 to M. Knecht, which discloses a rack installable in a water tank and which is designed to be earthquake proof, also receiving the fuel rod assemblies in close packing. The maintenance of the liquid level in the water tank is quite dependent upon the integrity of the reinforced concrete tank (reinforced with steel plate) for storing of the rack unit. Seismic safety is thus tied to massive steel sheet reinforced concrete storage pools, rather than to any improvement in rack configuration which would retain cooling water about irradiated rod assemblies despite unplanned liquid level loss about the rack.

U.S. Pat. No. 4,187,433 to Zezza discloses a high storage density nuclear fuel assembly in a pool with each fuel cell being vertically movable in the storage rack. Circulation openings at the top and bottom of the cells permit pool water circulation through them; of course, this is effective only so long as ambient water is available in the pool.

U.S. Pat. No. 4,318,492 to Peehs, et al., is directed to a fuel assembly storage capsule formed of a sleeve sealed at its bottom and having an upper opening closable by a cover that has a cross section matching that of the fuel assembly to be received therein. The sleeve and the cover rim define an annular space filled with air. No means for liquid circulation therethrough is taught.

U.S. Pat. No. 4,788,029 to Kerjean, et al., employs an apparatus for storing fuel assemblies in a pool where they are separated by a water gap. The walls of the cells are externally covered with a neutrophage material for irradiation control. There is no teaching relating to use of circulating liquid for waste heat removal and control.

OBJECTS OF THE INVENTION

It is a principal object of the present invention to provide a storage rack for toxic waste materials, e.g., hazardous irradiated fuels, which has a passive fail-safe protection feature while the rack is storable in a large volume moderator fluid pool.

It is another object of this inevention to provide a rack that requires no hasty and hazardous unit relocation to alternate moderator pools upon loss of liquid level in the main pool.

Still another object of the invention is to provide a storage rack configuration that will maintain nuclear isolation between RIF units, adequate liquid shielding for personnel, and means for ongoing removal of decay fuel heat upon loss of moderator fluid level from the main storage pool.

Yet another object of the invention is to provide a toxic waste storage system the use of which, in the event of liquid loss in the main storage pool, precludes having to invoke standard emergency fuel assembly safety actions usually initiated to maintain the existing liquid cover over resting assemblies.

SUMMARY OF THE INVENTION

In an effort to overcome the above-mentioned deficiencies of the prior art, the present invention provides a storage rack for retaining toxic waste materials, e.g., hazardous nuclear fuel assemblies, which are normally reposed in a liquid moderator filled pool. The rack of the present invention provides an important passive accident safety configuration, comprising an integral container with conjoined external sidewalls and a bottom plate adequate to support a liquid load as well as the weight of the stored assembly. A tailored cover plate contains insertion slots for the rod assemblies. By virtue of such a configuration, any unplanned loss of liquid level in the main storage pool does not inherently result in liquid level loss over the assemblies positioned within the rack. The outer container sidewalls are welded or otherwise securely affixed to an internal framework that supports the RIF assembly modules. The design and construction can thus accommodate the loss of hydrostatic head from the ambient water should the pool liquid level be lost.

The liquid present within the rack walls is retained despite any degree of liquid level drop occurring outside in the main pool. Nuclear isolation is maintained by the interstitial liquid filling in between and within the storage tubes, as is radiation shielding of personnel from the retained liquid cover over the cells within the rack. Moreover, the removal of heat from radioactive rods at least partially continues because heat generated by the nuclear fuel is dissipated into the ambient liquid, which then circulates by convection flow. Lastly, spread of hazardous contamination is precluded by the continuing liquid cover over the RIF modules while they reside in the storage rack of the invention. The operational aspects of the passive storage rack are otherwise identical to prior racks in normal use, except for its unique fail-safe, interim protection function, as described herein.

The storage rack is essentially, in its lateral configuration, a double walled shell. An integral inner rectangular shell (generally having no bottom plate) is interposed between the imperforate rack external sides and the periphery of the array of elongate receiving tubes adapted for containing irradiated fuel or similar toxic waste assemblies. The inner shell is sufficiently spaced from the sidewall to define a vertical peripheral passageway within the container sidewalls and is adapted to permit downward flow of the cooler moderator fluid entering from the ambient pool. Each of the elongate tubes has one or more ports disposed on its lower edge, which edge fixedly abuts the bottom plate. The ports are intended to permit bottom water inflow for absorbing the waste heat normally generated by the fuel assemblies loaded into the elongate tubes. Convection liquid flow moves the liquid through the rack while maintaining a more or less steady state temperature with cooling water flowthrough.

Exit ports are preferably located in the upper planar member (preferably having at least one for each elongate tube) to permit the escape of warmer liquid from the rack confines back into the ambient pool. An important feature of the present invention is that this rack structure assures that the retained moderator fluid can circulate fully through the rack proper only while it is disposed wholly beneath the pool level. Should the pool liquid level be lost, until major remedial steps are taken, the trapped liquid will then recirculate solely within the rack container, warming up steadily yet still providing interim protection.

In the presently preferred embodiment, the upper member is provided with a plurality of hinged squared edge covers having one or more ports in each to permit the escape of warmed liquid to the ambient pool. This hinging aspect facilitates the lifting out of the nuclear fuel assemblies, as desired. The hinge covers are conveniently aligned with the otherwise squared open ends of the elongate receiving tubes.

The foregoing general description will serve to explain the mode of operation and principles of the invention in general terms so as to enable those of ordinary skill in the art to which this invention pertains to make and use the same. The accompanying drawings, together with the following detailed description of the invention, will serve to further disclose the best mode currently contemplated by the inventors of carrying out the invention; they are exemplary and explanatory but are not restrictive of the invention, the scope of which is defined solely by the claims.

BRIEF DESCRIPTION OF THE DRAWINGS

The above and other objects, features, advantages, and benefits of the invention will become more fully apparent to those of ordinary skill in the art to which this invention pertains from studying the following description taken in conjunction with the following drawings, wherein like or corresponding reference characters refer to like or corresponding parts, and in which.

DETAILED DESCRIPTION

Figure 1:
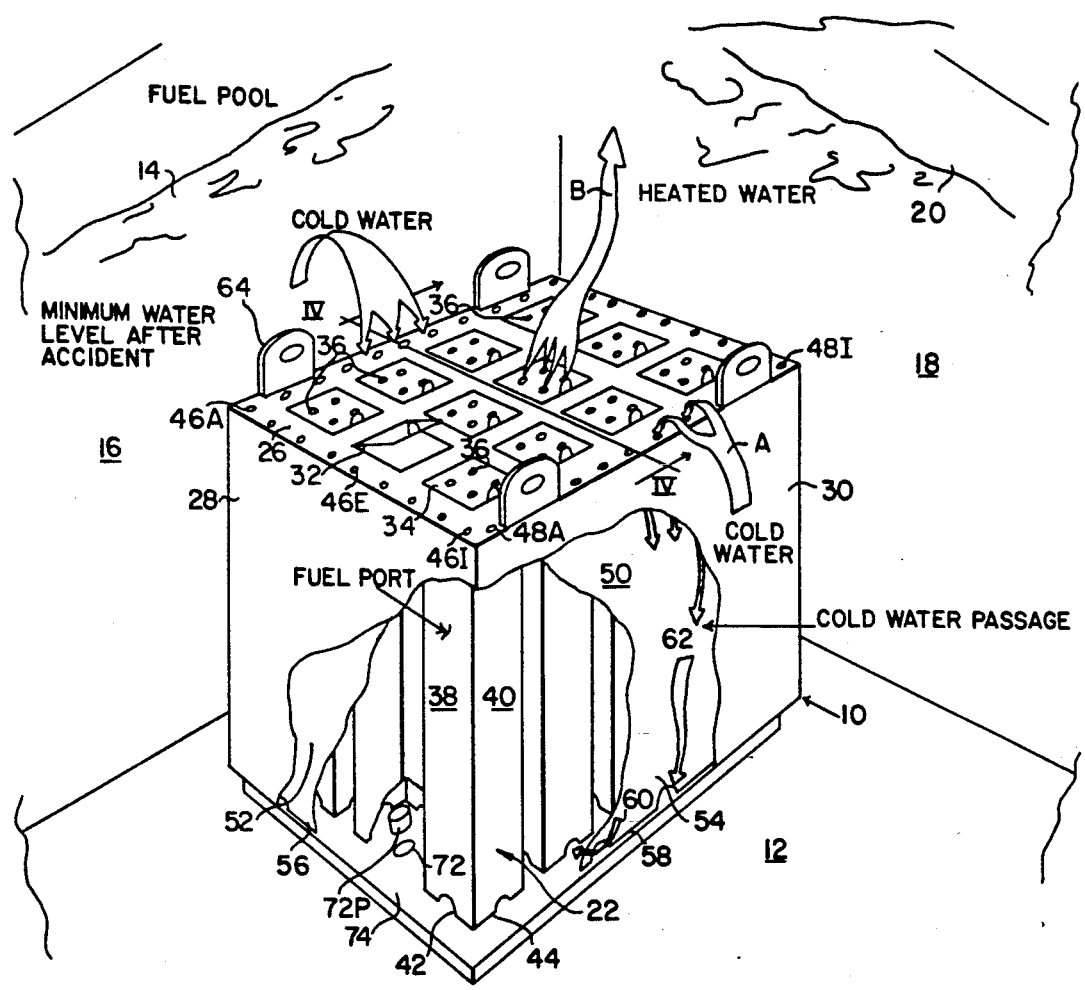
FIG. 1 is a perspective view of the storage rack for RIF storage cells and ambient reservoir, partly cut away to depict the wall configuration and components of the rack.

Referring to the drawings, FIG. 1 shows a presently preferred embodiment of a high density nuclear fuel assembly storage rack 10 resting on the planar bottom 12 of a liquid filled storage pool reservoir 14. Reservoir 14 has upstanding sidewalls 16 and 18 (the other sides being omitted for clarity) serving to contain a large volume of moderator fluid, usually water. The fluid serves as an economical coolant and personnel shield from the irradiated or spent fuel assemblies and support racks resting therein. The upper surface of pool 14 is conveniently open for visual surveillance by operators or by monitoring electronics.

Pool 14 is typically of sufficient dimensions to hold a plurality of storage racks 10 (one shown), and can be dimensioned to permit limited rack stacking (not shown) because of the failsafe advantages provided by the present inventive rack. There are a plurality of fuel storage cells (conveniently elongate tubes 22) which are arrayed linearly within the rack 10. Each of the cells commonly consists of a square tube 22, sized to slidingly accommodate one fixed rod assembly 24 of FIG. 2. The typical rack of FIG. 1 has three rows of four cells each. In a preferred embodiment, the rack upper cover plate 26 is sealingly joined with the upper periphery of rack outer walls 28 and 30 (rear sidewalls not shown). Lifting members 64 are mounted onto the top surface of the rack upper cover plate 26 for lifting the rack 10. Also, upper plate 26 is interrupted by a plurality of arrayed and hinged, squared edge cover traps 32 and 34, which are each coaxially aligned with receiving tubes 22. Each hinged cover 34 is provided with two or more perforations 36 which serve as exit ports for heated liquid flowing upwardly through receiving tube 22.

Figure 2:
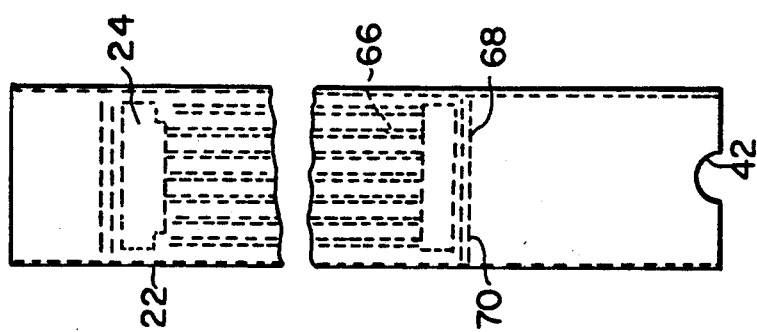
FIG. 2 is a side elevational view, in partial phantom, of a receiving tube including its array of spaced apart nuclear fuel rods.

As depicted in the broken away portion of FIG. 1, each of the lower ends of sidewalls 38 and 40 of tube 22 is provided with a respective arch-like port 42, 44, each of which permits the coldest water accumulated within the rack bottom to be drawn into receiving tube 22 and to circulate upwardly about the stored fuel rods assembly 24 (see FIG. 2). The rod generated waste heating effect creates a continual convection type, multipath circulation of cooling liquid within rack 10. As indicated by the flow directional arrows A and B, so long as the rack is immersed in the pool, cool ambient water is drawn through (Path A) the peripheral ports 46A to 46I and 48A to 48I of cover plate 32 to keep the rack filled, while warm water escapes (Path B) the tubes through the more central upper ports 36, which are disposed in each cover 34, and flows out to the ambient pool 14 where such heat is dissipated by natural diffusion effects.

Figure 4:
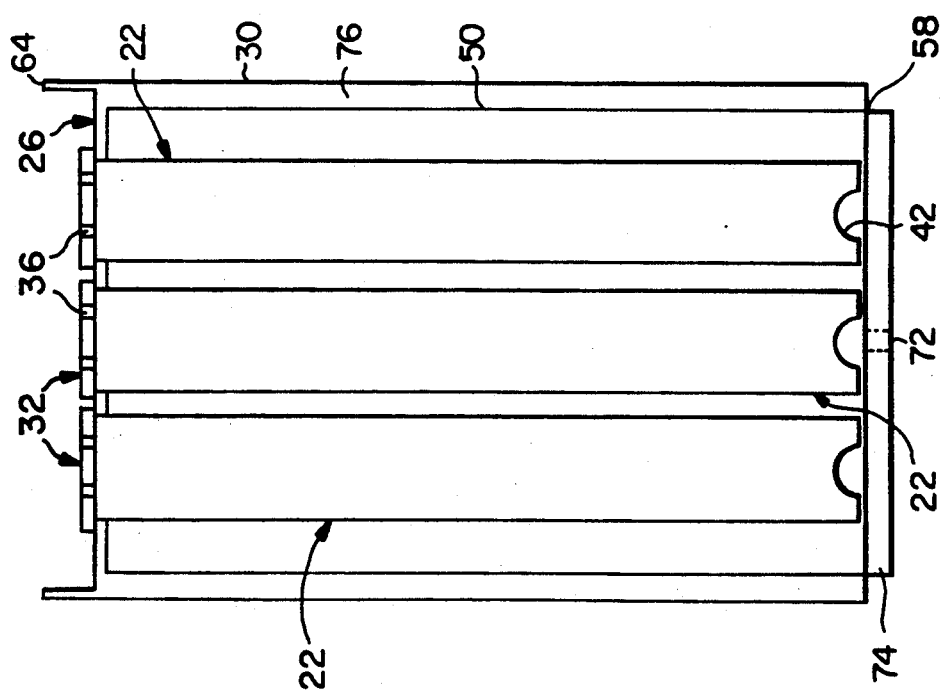
FIG. 4 is a vertical sectional view of the double walled storage rack for the fuel cell arrays, taken along line IV—IV of FIG. 1.

Rack 10 is further provided with a conformed inner rectangular shell 50 shown in FIG. 4, interposed between the conjoined tube sidewalls 28 and 30 and the outer periphery defined by the array of receiving tubes 22. Shell sidewalls 52 and 54 curve inwardly along their lower edges 56 and 58. These shell curvilinear edges are also provided with a number of vertically aligned, slotted ports 60 and 62. Ambient water flows into the rack peripheral ports 46A et al., down between each set of such sidewalls 30 and 54, through bottom ports 60 and 62 of shell 50 and into opposing ports 42 and 44 of the squared tubes 22. A continuous flow of cool water into and warm water out of the pool (see arrows) is attained while rack 10 is immersed in main reservoir 14.

It is an important feature of the present inventoion that, after an accident which causes the main pool water level to drop, the full water level (below cover 26) in rack 10 is maintained because of the imperforate outer wall construction of its sides and bottom.

Figure 3:
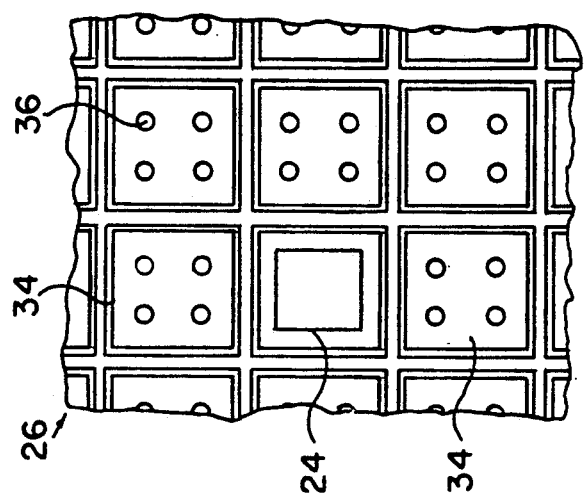
FIG. 3 is a fragmentary top plan view of a portion of the rack reservoir on an enlarged scale omitting one of the hinged covers for clarity.

As seen in the top plan view of FIG. 3, the recessed receiving tubes 22 and their hinged covers 34 are conveniently arranged in linear rows. These are operable square cells, as shown, with liquid escape ports 36 shown in their covers 34. One of the covers has been removed to depict (FIG. 3) the matching reduced configuration (cross sectional) of a nuclear fuel assembly 24 in situ. As best shown in FIG. 2, each tube 22 is of an appropriate vertical length to accept a fuel assembly 24, including a number of individual fuel rods 66. The tubes 22 can be made of suitable size to permit plural fuel assemblies in each rack, as depicted in FIGS. 1 and 3. A horizontal partition 68 is disposed in each tube nearer the lower end to support the fuel assembly therein. Orifice 70 is included in partition 68 so that cooling liquid can circulate freely through the tubes and past the fuel rods, having entered same via the bottom edged ports 42.

When a vacant rack is to be used for temporary storage, the drain and fill plug 72P in rack bottom 74 is removed. The entire rack 10 is then ready to be lowered into the main pool 14, which promptly becomes filled by ambient water entering via the peripheral ports and the unplugged bottom port 72. Plug 72P is suitably reinserted into plug port 72 to establish a seal, e.g. by threading engagement.

The moderator is usually water when the assemblies have recently been removed from a reactor, such being quite radioactive and then generating relatively large amounts of heat. When water is used, the entire rack is immersed in the water-filled reservoir, so that the water can circulate usefully through the tubes and thus serve as a coolant as well as a neutron moderator.

When the unloaded rack is to be lifted for any purpose, the plug 72P in port 72 can be remotely removed to drain the rack through the plug port as it rises above the surface of the main pool. When unloaded rack 10 is redeposited in the main pool, plug 72P is reinserted to reestablish the reservoir fail-safe nature of the rack.

The vertical section of FIG. 4, taken midway through rack 10, better reveals the outer peripheral passageway 76 used by the inflowing ambient cool water which moves downwardly toward the receiving tube lower aperture 42. The imperforate outer wall 30 of rack 10 is preferentially composed of high chrome stainless steel metal or the like which will withstand the oxidizing effects of circulating, surface-oxygenated warmed water. The inner shell wall 50 is conveniently of a substantially thinner gauge sheet metal of stainless steel or chromium coated bronze or brass which is also corrosion resistant, and thus is adapted for the inclusion of the bottom edging slotted ports 60 and 62 (FIG. 1).

Various modifications and alterations of this invention will become apparent to those skilled in the art without departing from the spirit of this invention. The presently preferred embodiment described herein illustrates the principles of the invention and its practical application so that one of ordinary skill in the art can utilize the invention in various embodiments and with various modifications as are suited to the particular use contemplated. More particularly, while the detailed description herein has focused on nuclear fuel rod storage assemblies, it will be appreciated that the present invention is broadly applicable to many other toxic waste disposal applications where the benefits thereof are desired. Accordingly, the scope of the invention is defined by the following claims.

What is claimed is:

1. A storage rack for retaining hazardous nuclear fuel rod assemblies normally disposed in liquid moderator filled pools while providing passive nuclear accident safety protection, comprising:
   a) a generally rectangular bottom plate;
   b) generally planar upstanding sidewalls conjoined along their vertical edges and joined along their lower edges to the periphery of said bottom plate to form an imperforate container;

c) a plurality of vertically disposed, rectangular receiving tubes having lower ends which rest upon the bottom plate and upper ends of which are conjoined with an upper planar member defining the upper surface of said storage rack;

d) a contiguous inner rectangular shell interposed between said conjoined sidewalls and the elongate receiving tubes disposed therein and spaced from the rack sidewalls to define a peripheral passageway with the sidewalls to permit convection liquid flowthrough of cooler moderator fluid entering from an ambient fluid pool to the rack bottom portion;

e) at least one laterally disposed inlet port on the lower edges of each of said elongate tubes configured to permit moderator liquid entry and upflow therein fostered by the heat which is generated by the nuclear fuel assembly normally stored in said tubes; and f) at least one outlet port disposed in the upper planar member and overlying each of the elongate tubes to permit escape of warmed temperature moderator liquid from the rack to the ambient filled pool, such that the moderator liquid can circulate through said rack both while it is beneath the pool liquid level and while it is devoid of an ambient liquid envelope.

2. The storage rack of claim 1 in which the upper member is provided with a plurality of hinged, squared edge covers having one or more ports, wherein the covers are coaxially aligned with the open tops of the elongate tubes.

3. The storage rack of claim 1 in which the rack bottom plate is provided with a resealable drain and refill orifice.

4. The storage rack of claim 1 in which the upper periphery of the rack is provided with two or more perforated lugs to facilitate hoisting and positioning of said rack in said filled pool.

5. The storage rack of claim 1 in which each receiving tube contains at least one fuel assembly, and the array is of elongate tubes is disposed in linear alignment and spaced to facilitate cooling fluid convection flow through the rack reservoir inlet and outlet ports.

6. The storage rack of claim 5 in which the inner rectangular shell has a plurality of generally vertical slots which facilitate moderator liquid flow into the ports on the lower edges of the elongate tubes.

7. The storage rack of claim 1 in which the upper member is provided with a linear array of peripheral ports which keep the rack liquid filled as warmed water escapes from the centrally located exit ports.

8. The storage rack of claim 7 in which the upper edges of the rack are provided with a perforated lug to facilitate lifting and resetting the rack in the liquid filled pool.

9. The storage rack of claim 1 in which the imperforate outer wall comprises high chrome stainless steel and the inner shell comprises a corrosion resistant, thinner gauge sheet metal.

10. A storage rack for retaining hazardous nuclear fuel rod assemblies normally disposed in liquid moderator filled pools and for further providing passive nuclear accident safety protection, said rack comprising:

a) a generally rectangular bottom plate;

b) a plurality of generally upstanding sidewalls conjoined along their vertical edges and joined along their lower edges to the periphery of said bottom plate to form an imperforate container, wherein both said bottom plate and side walls are formed of a high chrome stainless steel;

c) a plurality of vertically disposed, generally square cross section, open ended, elongate receiving tubes which, at their lower ends, rest upon the bottom plate surface and which at their upper ends intersect and are conjoined with an upper planar member defining the upper surface of the rack, said upper member having square edge covers each having one or more ports, and wherein said covers are coaxially aligned with the open ended tubes;

d) a contiguous inner rectangular shell interposed between said conjoined sidewalls and the periphery of the array of elongate receiving tubes disposed therein, said shell being a substantially thinner gauge sheet metal than said bottom plate or sidewalls and said shell having slotted ports therein;

e) the inner shell also being spaced from the rack sidewalls to define a peripheral passageway therebetween which permits convection liquid flowthrough of cooler moderator fluid entering from an ambient fluid pool to the rack bottom portion;

f) one or more laterally disposed ports on the lower edges of each of said elongate tubes adapted for moderator liquid entry and upflow therein as fostered by waste heat generated by the nuclear fuel assemblies normally stored in said tubes; and g) one or more exit ports disposed in the upper planar member and overlying each of the elongate tubes to permit escape of warmer elevated temperature moderator liquid from the rack to the ambient filled pool, such that the moderator liquid can circulate through said rack both while it is beneath the pool liquid level and while it is devoid of ambient liquid.

* * * * *